Nov. 14, 1967  A. G. BUTTS ETAL  3,352,043
DISPLAY DEVICE
Filed July 30, 1965  3 Sheets-Sheet 1
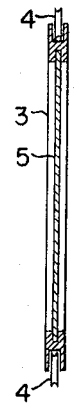
FIG. 2
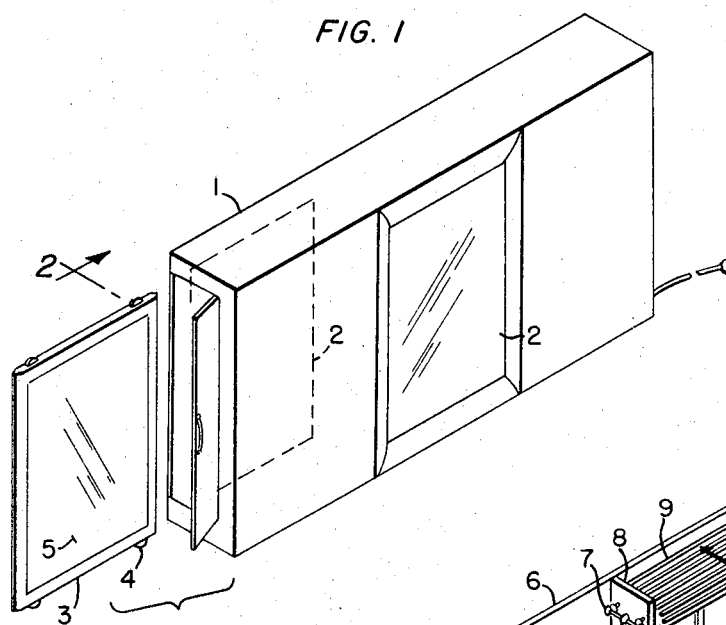
FIG. 1
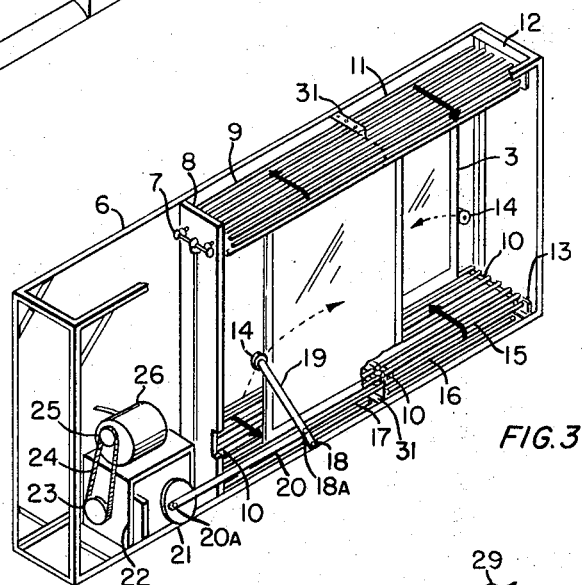
FIG. 3
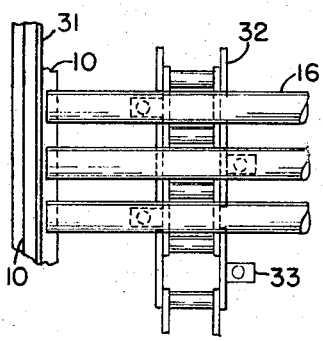
FIG. 6  FIG. 6A
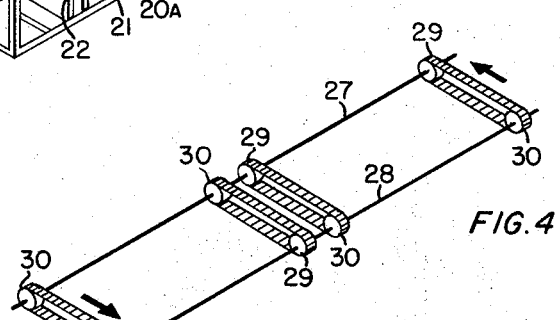
FIG. 4
FIG. 5
ARTHUR G. BUTTS
JERRY L. BUTTS
INVENTORS
BY
Tom Sherrard, atty.

Nov. 14, 1967  A. G. BUTTS ETAL  3,352,043
DISPLAY DEVICE
Filed July 30, 1965  3 Sheets-Sheet 2
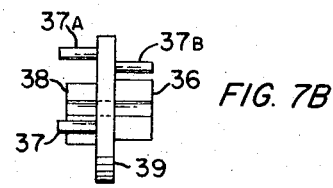
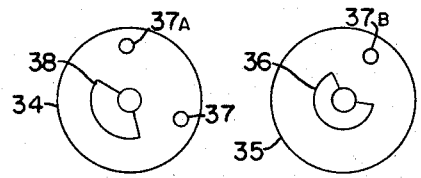
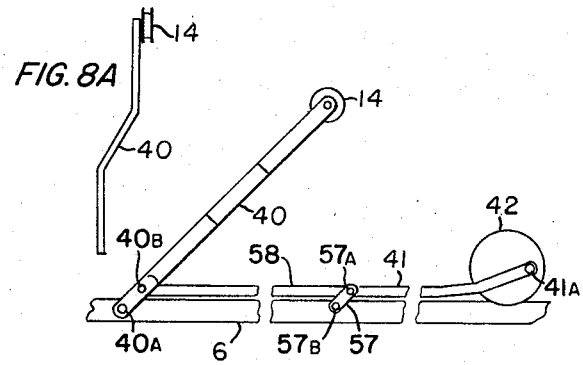
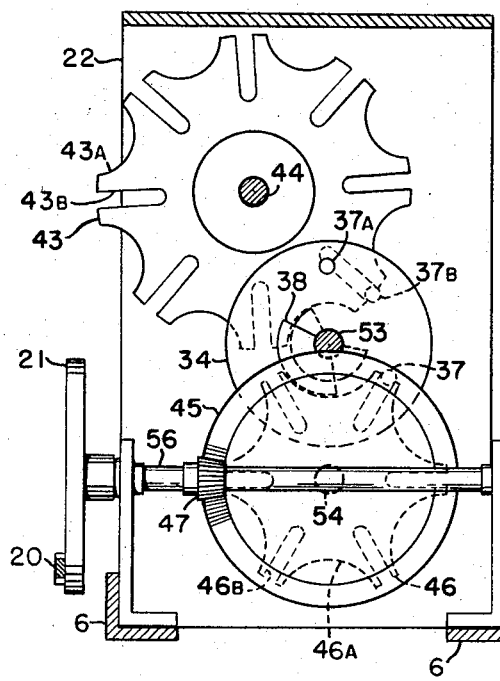
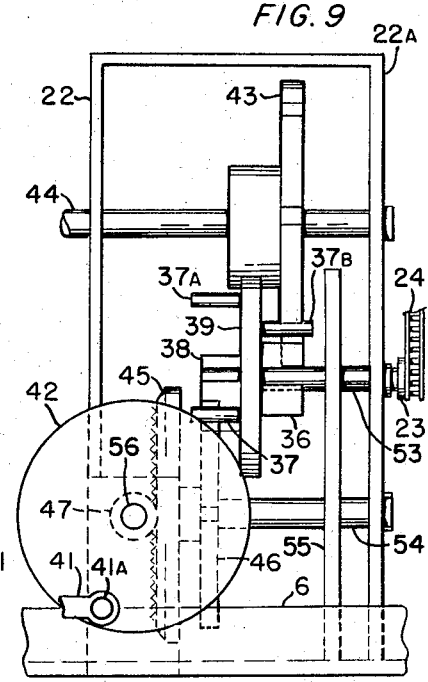
ARTHUR G. BUTTS
JERRY L. BUTTS
INVENTORS
BY
Tom Sherrard, atty.

Nov. 14, 1967  A. G. BUTTS ETAL  3,352,043
DISPLAY DEVICE
Filed July 30, 1965  3 Sheets-Sheet 3
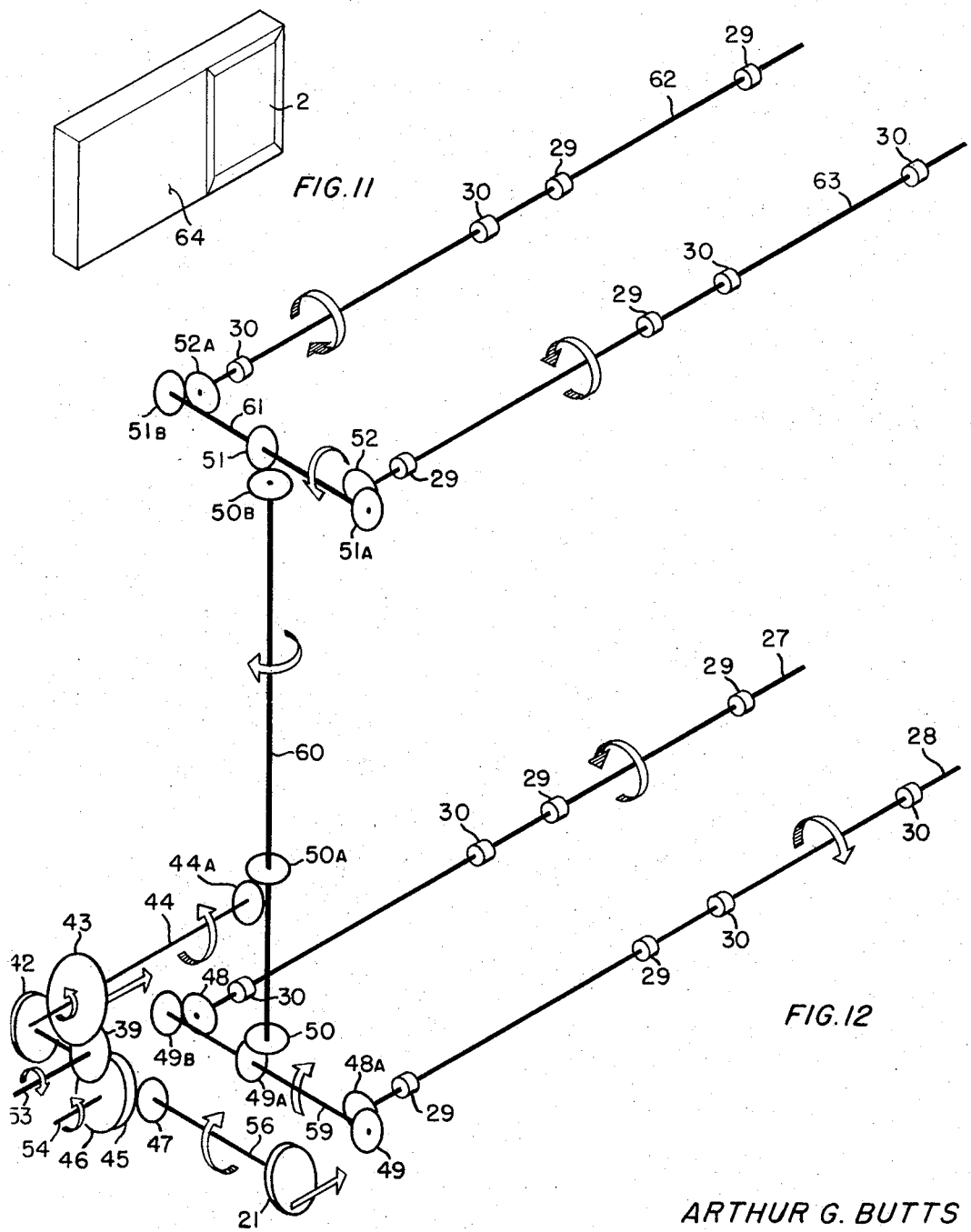
ARTHUR G. BUTTS
JERRY L. BUTTS
INVENTORS
BY
Tom Sherrard, atty.

United States Patent Office 3,352,043
Patented Nov. 14, 1967

3,352,043
DISPLAY DEVICE
Arthur G. Butts, 3836 Wilson, San Diego, Calif. 92104, and Jerry L. Butts, 757 Grand Ave., Apt. F, Spring Valley, Calif. 92109
Filed July 30, 1965, Ser. No. 476,004
6 Claims. (Cl. 40—78)

ABSTRACT OF THE DISCLOSURE

This disclosure relates to a display device for alternately and selectively positioning display signs before a window in a display housing. The signs are carried between upper and lower continuous conveyor means and two such sets of conveyor means are utilized, with upper and lower conveyors being respectively aligned. A transfer means is provided for moving signs from one set of conveyors to another set of conveyors and a novel drive assembly means which includes a pinion gear having dual drive pins is utilized for alternately driving the conveyor means and transfer means.

---

This invention relates to a device for displaying visual material, especially that which lends itself to a series of impressions as in advertising and visual education.

An object of our invention is to provide a device which will permit a series of cards to be exposed to vision in an automatic and orderly manner.

A further object of our invention is to provide such a device which is compact and movable and which may be viewed from two directions.

Another object of the present invention is to provide a device of a type which is of simple construction, inexpensive to manufacture and efficient to operate.

For other objects and for a better understanding of the invention, reference may be had to the following detailed description taken in connection with the accompanying drawing in which:

FIGURE 1 is a perspective view of our device,
FIGURE 2 is a cut-away view from the end of a sign element,
FIGURE 3 is a perspective view of the device with the case removed,
FIGURE 4 is a diagram showing upper conveyor system,
FIGURE 5 is a top plan view of a conveyor section,
FIGURE 6 is an end view and side view of a transfer arm roller,
FIGURE 7 is a diagram of the pinion gear,
FIGURE 8 is a side elevation detail of a transfer means assembly,
FIGURE 9 is a side elevation of the drive assembly,
FIGURE 10 is an end view of the drive assembly,
FIGURE 11 is a perspective view of a preferred form of the case of the device,
FIGURE 12 is a schematic diagram showing the relative direction of the moving parts of the device.

Referring to the drawing showing the preferred structure in which like numbers represent like parts throughout, the number 6 of FIG. 3 represents a three dimensional structural frame made preferably of metal in which the other parts, except the case are housed.

A case 1 constructed of sheet metal may cover said frame. Such case may have one or more openings 2, preferably as shown in FIG. 11. A door may be provided at either or both ends thereof.

A plurality of sign elements are comprised of visual material 5; frame 3 (FIG. 2) and four rollers 4, one at each corner of the frame. The sign elements are all identical except that the visual material of each will probably be different. All sign elements rest on said rollers and stand in parallel space relationship. The outer edge of the rollers are grooved. There is a groove on the inside edges of frame 3 to retain material 5.

Mounted within frame 6 are a plurality of continuous conveyors. The conveyors are formed of contact runners 15 and 16, held on dual continuous chains 32 by brackets 33. See FIG. 5. There are preferably four conveyor units, all are the same except in position and direction of turning. We prefer to have two units, 15 and 17, aligned with one another (FIG. 3) at the bottom of our device and another two units, 9 and 11 so aligned directly above. Sprocket 29 and 30 operate with chain 32. The sprockets are mounted on shafts 27 and 28 at the bottom and 62 and 63 at the top. These revolve in bearings mounted on the frame by adapter-brackets 12 and 13 at one end, support member 8 at the opposite end and brackets 31 in the middle. Some of the sprockets are secured to their respective shafts and some are idle sprockets thereon. In this manner the conveyors may move in the direction of the arrows in FIG. 3 as the shafts rotate in the direction of the arrows of FIG. 12. Member 10 to support the sign elements may be associated with the conveyors.

A transfer means is provided to move a sign element from one set of conveyors to another. Such means are preferably two in number. One is comprised of arm 19 swively mounted on ball bearing 18 at the base of frame 6 near the mid section of one end of conveyor 17. One end of the arm is provided with roller 14 and connecting member 20 is operatively connected thereto at 18A. Disk crank 21 with its bearing mount 20A completes this transfer means.

Similarly arranged is a return transfer means on the opposite side of that first mentioned. As can best be seen in FIG. 8 this arrangement similarly has a roller 14 on one end of arm 40 while swively mounted to frame 6 by bearing 40A at the opposite end. Here, connecting member 41 operatively joins its disk crank 42 with item 40 by a bearing at point 40B. Support 57 connected to connecting member 41 at end 57A and frame 6 at end 57B aid in a steady operation of the continuation 58 and member 41.

A novel feature of our contribution to the art is a drive assembly. It has as an essential part thereof the pinion gear illustrated as FIG. 7; one side of which is marked 34. The opposite side 35 thereof has a surface 39 conveyor engaging pin 37B and guide 36. On side 34 is sign element engaging pin 37A and return pin 37 with guide 38. This unique pinion gear is secured to a rotatable shaft 53 operatively mounted through form 22A and 55.

Another portion of the drive assembly is the conveyor drive train formed preferably of index wheel 43 which is secured to shaft 44 journaled through standard 22 and 22A. Wheel 43 has slotted recess portions 43B, preferably eight in number at regular intervals with arched recesses 43A therebetween.

Shaft 44 has secured to one end thereof bevel gear 44A which, with bevel gear 50A, form miter gears. Vertical shaft 60 extends through gear 50A; it is rotatably mounted on the side of item 8 as shown in FIG. 3. Bevel gears 50B at the top end and 50 at the bottom end are, like gear 50A secured to shaft 60. The conveyor drive train is completed by miter gears at the top formed by bevel gears 51B and 51A secured to shaft 61 on each end thereof with bevel gear 51 therebetween, as is illustrated by item 7 of FIG. 3. Bevel gear 52A secured on end of shaft 62 meshes with gear 51B. Similarly, at the bottom, bevel gears 49B and 49 secured to shaft 59 on each end thereof with bevel gear 49A therebetween form a lower portion of the conveyor drive assembly. Meshing with gear 49 is gear 48A secured to the end of shaft 28 and meshing with gear 49B s gear 48 secured to the end of shaft 27, all in the usual miter arrangement.

Turning now to another arrangement motivated by the same pinion gear, our unique transfer drive train is considered. As can be seen in FIG. 10 a second index wheel 46 is secured to shaft 54 journalled through standard 22A and support 55. Gear 46 has slotted recess portions 46B, preferably six in number at regular intervals with arched recesses 46A therebetween.

Shaft 54 has secured to one end thereof ring gear 45 which engages with gear 47 (FIG. 12) secured to shaft 56. Secured to each end of the shaft 56 is aforementioned disk cranks. This completes the transfer drive train.

Lastly, all moving parts of the device are motivated by a single power source. This source is preferably a common electric motor 26 of low r.p.m. It is mounted on standard 22 as illustrated in FIG. 3 and is connected to shaft 53 by chain 24 on sprockets 25 and 23.

The operation of our device is as follows:

Various display copy is slipped into frames 3 and the sign elements containing such copy are loaded into the device onto conveyors 9 and 17 at one end thereof. The device is now ready for use.

Motor 26 is turned on causing the pinion gear to turn constantly. As pin 37B engages a recess in wheel 43 the conveyor drive train is activated and all conveyors move a short uniform distance. Thusly sign elements on the left in FIG. 3 move towards the front and simultaneously the sign elements on the right move an equal distance towards the rear.

As pin 37B is disengaged from item 43B, all conveyors are stopped. Thereupon pin 37A is engaged with recess 46B of wheel 46 causing the transfer drive system to operate. The transfer means contacts two sign elements, pushing them off one set of conveyors onto another simultaneously. The first sign element is pushed to the right, the last one to the left as shown in FIG. 3. Next pin 37 engages another recess 46B causing disk cranks 42 and 21 to complete a full turn returning arms 19 and 42 to their original position. This completes a circuit which continues so long as the motor runs. Eventually all signs appear before the viewing space in the case for a brief period of time, in a still position, and then move on to be replaced by the next following sign.

Having thusly described our invention, we claim:

1. In combination:
   (A) display element housing means,
   (B) a plurality of display elements in parallel space relationship mounted therein,
   (C) a plurality of aligned continuous conveyor means for carrying display elements,
   (D) transfer means for intermittently moving display elements from one conveyor means to another,
   (E) drive assembly means operatively connected to the conveyor means and transfer means for alternately and regularly motivating said conveyor means and transfer means, and
   (F) a continuous power source which motivates the drive assembly.

2. The claim according to claim 1 above wherein said housing means includes a case with an opening for viewing said display elements.

3. The combination of claim 1 wherein said aligned conveyor means includes two pair of endless conveyor mechanisms, each said pair comprising an upper and lower conveyor mechanism, the upper conveyor mechanisms being aligned and relatively oppositely rotatable, and the lower conveyor mechanisms being aligned and relatively oppositely rotatable.

4. The combination of claim 1 wherein said conveyor means are adapted to receive display elements when not in motion.

5. The combination of claim 1 wherein said conveyor means are adapted for selectively positioning said display elements within said housing means.

6. The combination of claim 1 wherein said drive assembly means includes a continuously rotatable pinion gear having dual pin means for alternately respectively engaging (1) a conveyor drive train operatively connected to each conveyor means and (2) a transfer drive train operatively connected to each transfer means.

References Cited
UNITED STATES PATENTS

| | | | |
|---|---|---|---|
| 986,965 | 3/1911 | Crogan | 40—78 |
| 1,707,861 | 4/1929 | Kauffman | 40—79 |

EUGENE R. CAPOZIO, *Primary Examiner.*

W. GRIEB, *Examiner.*